Dec. 3, 1940.　　　A. E. RINEER　　　2,223,640

INDICATING DEVICE

Filed June 15, 1938

INVENTOR
Arthur E. Rineer
BY
Henry G. Dybvig
ATTORNEY

Patented Dec. 3, 1940

2,223,640

UNITED STATES PATENT OFFICE 2,223,640

INDICATING DEVICE

Arthur E. Rineer, Dayton, Ohio

Application June 15, 1938, Serial No. 213,937

9 Claims. (Cl. 73—110)

This invention relates to an indicating device and more particularly to an indicating device for accurately measuring displacement.

It is a characteristic of all springs that the displacement is proportional to the force exerted upon the spring. However, if the spring used as a lever is moved about a pivot, the linear displacemenet along a straight line will vary, that is, the effective length of the spring measured with respect to a straight line and a pivot changes. Numerous attempts have been made to compensate for the change in the effective length of a spring.

An object of this invention is to provide a floating fulcrum for a spring functioning as a lever, which fulcrum is automatically shifted so as to cause the uniform displacement of the spring along a straight line.

Another object of this invention is to provide an adjustment for changing a compensating mechanism by controlling the effective length of a lever.

Another object of this invention is to provide an arcuate support contacting a lever, the arcuate support being provided with adjusting mechanism for changing the radius of curvature thereof.

Another object of this invention is to provide means for shifting a lever to change the relative effectiveness thereof.

Another object of this invention is to provide an indicating device that is cheap, easily manufactured, accurate, easily adjusted and flexible to accommodate changed conditions.

Other objects and advantages reside in the construction of parts, the combination thereof and the mode of operation, as will become more apparent from the following description.

Figure 1:
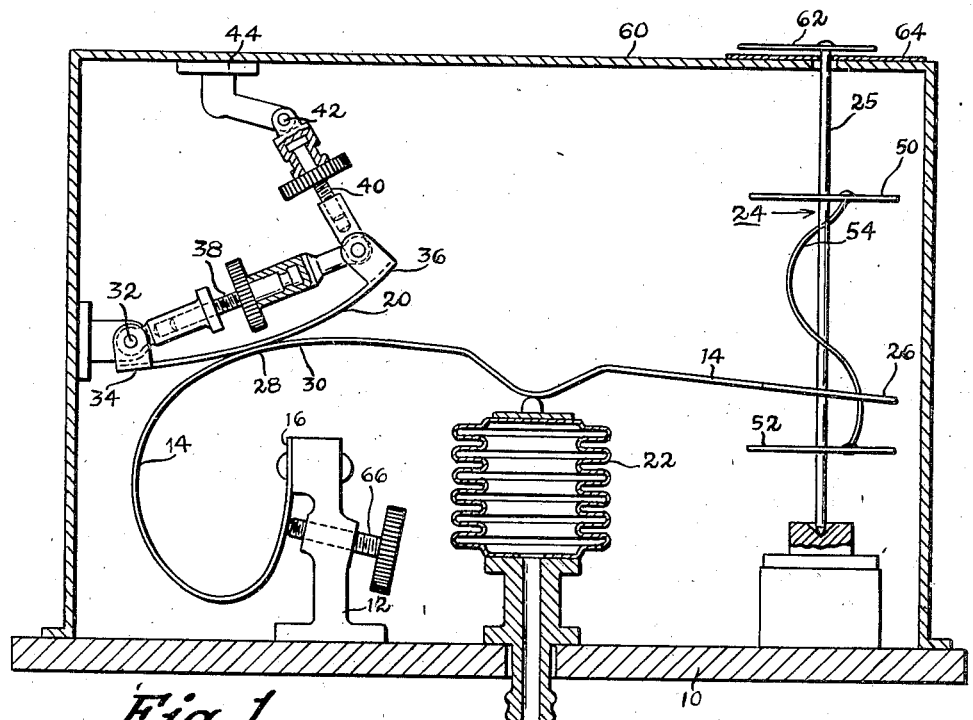
Figure 1 is a side elevation showing the indicating device in section.
Figure 2:
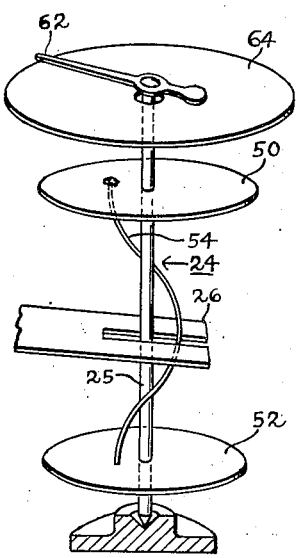
Figure 2 is a perspective view of a portion of the indicating mechanism.

Referring to the drawing, a case 10, shown in section, supports an upwardly projecting standard 12, having fixedly attached thereto a substantially J-shaped leaf spring member 14, having its end 16 riveted or otherwise attached to the standard 12. This spring engages a fulcrum 20, which will be more fully described later, and is subjected to the influence of an actuating device such as a bellows 22. The free end of the spring 14 drives a suitable indicating mechanism 24, which will be described more fully. Suffice to state, that as the top of the bellows 22 exerts a pressure against the spring 14, the outer end 26 of the spring is raised and when the force exerted by the bellows 22 is decreased, the outer end 26 of the spring is lowered. It is very desirable that the movement of the outer end 26 of the spring 14 be uniform for equal increments of chance in force. If the movements of the outer end 26 of the spring 14 were measured along the arc swept out by the free end of the spring, the magnitude of each movement would be in direct proportion to the force applied; but in many indicating devices the arcuate movement is measured in the direction of a straight line. In the modification disclosed, the movement is resolved along the vertical axis, parallel to the axis of the shaft 28. As is well known, uniform increments of movements of the end of the spring are translated into vertical movements in proportion to the sine of the angle of displacement.

In the embodiment shown, the vertical displacement of the end of the spring 14 is substantially constant. This has been accomplished by providing an arcuate, flexible fulcrum member 20 for the spring 14, so that the effective length of the lever is changed whenever the displacement of the spring is changed. This length is changed automatically. As the spring ascends, the point of contact has shifted from the point 28 to a point 30, thereby accelerating the movement of the end 26 of the spring as the spring is displaced. The curvature of the fulcrum 20 and the position thereof may be adjusted. This fulcrum includes the following structure.

The flexible fulcrum member 20, arcuate in shape, is pivotally mounted at 32. The ends 34 and 36 of the arcuate member may be adjusted toward each other and away from each other by the turnbuckle 38. By tightening or shortening the turnbuckle 38, the radius of curvature of the fulcrum 20 is decreased. By loosening or extending the turnbuckle 38, the radius of curvature is increased. The fulcrum 20 may be swung or oscillated about the pivot 32 by adjusting the turnbuckle 40, which has one end mounted upon a pivot 42 fixedly attached to a bracket 44, rigidly mounted to the case enclosing the working mechanism. The other end of the turnbuckle 40 is pivotally attached to the swinging end of the fulcrum 20. By adjusting the turnbuckle 40, the point of contact between the fulcrum 20 and the spring 14 is adjusted. By so doing, the indicator mechanism may be calibered.

In the embodiment disclosed, a bellows 22 responding to changes in pressure has been shown.

The upper end of the bellows 22 may be welded or soldered, or otherwise secured to the under side of the spring 14. In some installations a mere contact may be used between the bellows and the spring. Instead of bellows, any other actuating mechanism may be used responding to changes in temperature, pressure, humidity, weight, et cetera.

The end 26 of the spring 14 is bifurcated and is guided by a shaft 25. This shaft 25 is rotated as the spring 14 is actuated upwardly or downwardly by a mechanism now to be described. The shaft 25 carries a pair of disc members 50 and 52 fixedly attached to the shaft and supporting a helical member 54 made from spring wire or from any suitable material. As the end 26 of the spring is raised, the shaft 25 is rotated in one direction by the bifurcated end straddling member 54. When the end 26 of the spring is lowered, the shaft 25 is rotated in the opposite direction. In order to reduce friction, the lower end of the shaft 25 is preferably tapered, so as to have a substantially point contact with the base. The upper end of shaft 25 projects through the top 60 of the casing and supports an indicator or pointer 62, registering with indicia upon the dial 64. The dial 64 is preferably rotatably mounted, so that the instrument may be calibrated or adjusted to any position when no load is applied, by rotating the dial 64 so that zero or any other predetermined point registers with the pointer 62. Then as the lever 14 is deflected, the indicator is rotated and the amount may be read upon the dial 64. The spring 14 may have its zero position adjusted by the adjusting screw 66 mounted in the standard 12 and engaging the spring 14 in spaced relation from its end 16.

Although a bellows has been used for actuating the lever, any other suitable linear movement may be registered or measured by merely connecting the device producing the linear movement to the standard 98.

Although the preferred modification of the device has been described, it will be understood that within the purview of this invention various changes may be made in the form, details, proportion and arrangement of parts which generally stated consist in a device capable of carrying out the objects set forth, in the novel parts, combination of parts and mode of operation, as disclosed and defined in the appended claims.

Having thus described my invention, I claim:

1. An indicating device for indicating increments of displacement of a movable member responding to changed conditions, said indicating device including a substantially J-shaped spring member having the end of the stem bifurcated, indicating means including a spirally disposed actuating member straddled by said bifurcated end of the stem for actuating an indicant, said J-shaped member having the end opposite the bifurcated end fixedly mounted, an arched fulcrum adjustably mounted in spaced relation from the fixed end of the spring and engaging the J-shaped member on the side of the bight substantially opposite the fixed end, means for changing the radius of curvature of the arcuate fulcrum, means for adjusting the position of the arcuate fulcrum, and means responding to the changed conditions, said last means engaging the spring member between the fulcrum and the bifurcated end for swinging the free end of the spring member to actuate the spirally disposed actuating member.

2. An indicating device for indicating increments of displacement of a movable member responding to changed conditions, said indicating device including a substantially J-shaped spring member having the end of the stem bifurcated, indicating means including a spirally disposed actuating member straddled by said bifurcated end of the stem for actuating an indicant, said J-shaped member having the end opposite the bifurcated end fixedly mounted, an arched fulcrum adjustably mounted in spaced relation from the fixed end of the spring and engaging the J-shaped member on the side of the bight substantially opposite the fixed end, means for shifting the fulcrum, and means responding to changed conditions, said last means engaging the spring member between the fulcrum and the bifurcated end for swinging the free end of the spring member to actuate the spirally disposed actuating member.

3. An indicating device for indicating increments of displacement of a movable member responding to changed conditions, said indicating device including a substantially J-shaped spring member having the end of the stem bifurcated, indicating means including a spirally disposed actuating member straddled by said bifurcated end of the stem for actuating an indicant, said J-shaped member having the end opposite the bifurcated end fixedly mounted, an arched fulcrum adjustably mounted in spaced relation from the fixed end of the spring and engaging the J-shaped member on the side of the bight substantially opposite the fixed end, means for changing the radius of curvature of the arcuate fulcrum, and means responding to the changed conditions, said last means engaging the spring member between the fulcrum and the bifurcated end for swinging the free end of the spring member to actuate the spirally disposed actuating member.

4. An indicating device for indicating increments of displacement of a movable member responding to changed conditions, said indicating device including a substantially J-shaped spring member having the end of the stem bifurcated, indicating means including a spirally disposed actuating member straddled by said bifurcated end of the stem for actuating an indicant, said J-shaped member having the end opposite the bifurcated end fixedly mounted, an adjustably mounted arched fulcrum member having one end pivotally mounted in spaced relation from the fixed end of the spring, said arched fulcrum member engaging the J-shaped member on the side opposite the bight, adjustable means for supporting the other end of the fulcrum member, the adjustment of said adjustable means shifting the fulcrum member relative to said J-shaped member, and means responding to the changed conditions, said last means engaging the spring member between the fulcrum and the bifurcated end for swinging the free end of the spring member to actuate the spirally disposed actuating member.

5. An indicating device for indicating increments of displacement of a movable member responding to changed conditions, said indicating device including a substantially J-shaped spring member having the end of the stem bifurcated, indicating means including a spirally disposed actuating member straddled by said bifurcated end of the stem for actuating an indicant, said J-shaped member having the end opposite the 'bifurcated end fixedly mounted, means for adjusting the tension of said J-shaped member, an arched fulcrum adjustably mounted in spaced relation from the fixed end of the spring member and engaging the J-shaped member on the side of the bight substantially opposite the fixed end, means for changing the radius of curvature of the arcuate fulcrum, means for adjusting the position of the arcuate fulcrum, and means responding to the changed conditions, said last means engaging the spring member between the fulcrum and the bifurcated end for swinging the free end of the spring member to actuate the spirally disposed actuating member.

6. An indicating device for indicating increments of displacement of a movable member responding to changed conditions, said indicating device including a substantially J-shaped spring member having the end of the stem bifurcated, indicating means including a spirally disposed actuating member straddled by said bifurcated end of the stem for actuating an indicant, said J-shaped member having the end opposite the bifurcated end fixedly mounted, means for adjusting the tension of said J-shaped member, said means including a screw adjustably mounted for movement toward and away from the bight of the J-shaped member, an arched fulcrum adjustably mounted in spaced relation from the fixed end of the spring and engaging the J-shaped member on the side of the bight substantially opposite the fixed end, means for shifting the position of the arched fulcrum relative to said J-shaped member, and means responding to the changed conditions, said last means engaging the spring member between the fulcrum and the bifurcated end for swinging the free end of the spring member to actuate the spirally disposed actuating member.

7. An indicating device for indicating increments of displacement of a movable member responding to changed conditions, said indicating device including a substantially J-shaped spring member having the end of the stem bifurcated, indicating means including a spirally disposed actuating member straddled by said bifurcated end of the stem for actuating an indicant, said J-shaped member having the end opposite the bifurcated end fixedly mounted, an arched fulcrum adjustably mounted in spaced relation from the fixed end of the spring and engaging the J-shaped member on the side of the bight substantially opposite the fixed end, a turnbuckle interconnecting the ends of the arched fulcrum for adjusting the radius of curvature thereof, and means responding to the changed conditions, said last means engaging the spring member between the fulcrum and the bifurcated end for swinging the free end of the spring member to actuate the spirally disposed actuating member.

8. An indicating device for indicating increments of displacement of a movable member responding to changed conditions, said indicating device including a substantially J-shaped spring member having the end of the stem bifurcated, indicating means including a spirally disposed actuating member straddled by said bifurcated end of the stem for actuating an indicant, said J-shaped member having the end opposite the bifurcated end fixedly mounted, an arched fulcrum adjustably mounted in spaced relation from the fixed end of the spring and engaging the J-shaped member on the side of the bight substantially opposite the fixed end, one end of said arched fulcrum being supported upon a fixed pivot, a turnbuckle connected to the opposite ends of the arched fulcrum for shifting the fulcrum relative to the J-shaped member and means responding to changed conditions, said last means engaging the spring member between the fulcrum and the bifurcated end for swinging the free end of the spring member to actuate the spirally disposed actuating member.

9. An indicating device for indicating increments of displacement of a movable member responding to changed conditions, said indicating device including a substantially J-shaped spring member having the end of the stem bifurcated, indicating means including a spirally disposed actuating member straddled by said bifurcated end of the stem for actuating an indicant, said J-shaped member having the end opposite the bifurcated end fixedly mounted, an arched fulcrum adjustably mounted in spaced relation from the fixed end of the spring and engaging the J-shaped member on the side of the bight substantially opposite the fixed end, a turnbuckle interconnecting the ends of the fulcrum, the adjustment of which changes the radius of curvature of the fulcrum, a second turnbuckle for adjusting the position of the arcuate fulcrum relative to the spring member, and means responding to the changed conditions, said last means engaging the spring member between the fulcrum and the bifurcated end for swinging the free end of the spring member to actuate the spirally disposed actuating member.

ARTHUR E. RINEER.